US005618046A

United States Patent [19]

Binford

[11] Patent Number: 5,618,046
[45] Date of Patent: Apr. 8, 1997

[54] PISTON RING ASSEMBLY

[75] Inventor: John D. Binford, Richmond, Ind.

[73] Assignee: Dana Corporation, Toledo, Ohio

[21] Appl. No.: 39,684

[22] Filed: Mar. 15, 1993

Related U.S. Application Data

[63] Continuation of Ser. No. 799,425, Nov. 25, 1991, abandoned.

[51] Int. Cl.$^6$ ........................................ F16J 9/06
[52] U.S. Cl. .................. 277/163; 277/138; 277/216; 92/193
[58] Field of Search ................... 277/138, 139, 277/140, 141, 144, 168, 216, 217, 163; 92/193

[56] References Cited

U.S. PATENT DOCUMENTS

| 1,263,850 | 4/1918 | Cain . | |
|---|---|---|---|
| 1,527,535 | 10/1920 | Bockwitz . | |
| 1,911,736 | 2/1931 | Wilkening . | |
| 2,036,721 | 4/1936 | Roberts . | |
| 2,078,519 | 4/1937 | Wilkening et al. . | |
| 2,160,379 | 5/1939 | Carroll . | |
| 2,177,700 | 10/1939 | Fisher . | |
| 2,459,395 | 1/1949 | Smith | 277/216 |
| 2,871,071 | 1/1959 | Brenneke . | |
| 2,940,803 | 6/1960 | Phillips . | |
| 2,970,023 | 1/1961 | Thompson | 277/216 |
| 2,996,343 | 8/1961 | Allbright . | |
| 3,031,240 | 4/1962 | Olsen . | |
| 3,066,943 | 12/1962 | Brenneke | 277/139 |
| 3,237,953 | 3/1966 | Lucas . | |
| 3,253,836 | 5/1966 | Hamm | 277/138 |
| 3,326,561 | 6/1967 | Braendel . | |
| 3,826,508 | 7/1974 | Packard | 277/216 |
| 3,831,952 | 8/1974 | Geffrey | 277/216 |
| 4,045,036 | 8/1977 | Shunta | 277/138 |
| 4,210,338 | 7/1980 | Collings, Jr. | 277/216 |
| 4,326,724 | 4/1982 | Gernandt . | |
| 4,629,200 | 12/1986 | Ruddy . | |
| 4,973,066 | 11/1990 | Duck et al. | 277/216 |

FOREIGN PATENT DOCUMENTS 122130  1/1919  United Kingdom .

Primary Examiner—Daniel G. DePumpo
Attorney, Agent, or Firm—Robert M. Leonardi; Frank B. McDonald; Barbara Joan Haushalter

[57] ABSTRACT

A piston ring assembly comprises a piston ring, a spring for providing an outward force on the ring, and a rail for engaging a cylinder wall. The piston ring is retained in a piston groove in a piston. During upward movement of the piston in a cylinder, oil above the ring face is forced between the first front surface and the top surface into the piston groove to an inner portion of the piston groove. During downward movement of the piston, the downward force urges cocking of the piston ring about the ring face to tilt the ring face away from the cylinder wall, leaving the lower front of the ring face in scraping abutment with the cylinder wall.

10 Claims, 1 Drawing Sheet

PISTON RING ASSEMBLY

This is a continuation of application Ser. No. 07/799,425, filed Nov. 25, 1991 now abandoned.

BACKGROUND OF THE INVENTION

The present invention relates to piston rings for internal combustion engines and, more particularly, to an oil control ring to minimize the oil consumption of piston engines.

The difference in diameter between a piston and the cylinder in which it operates necessitates the use of some type of a sealing arrangement. The sealing arrangement is necessary if any substantial amount of compression is to be developed, and if excessive movement of oil from the crankcase into the combustion chamber is to be prevented. It is conventional practice to provide one or more peripheral grooves on the piston, and to install resilient rings in these grooves which are the approximate form of an interrupted circle. It is the intention that the ring or rings should bear directly against the cylinder wall, and should affect a seal against the sides of the groove in which the ring is positioned.

The inevitable difference between the width of the ring groove and the thickness of the ring creates a problem which has proven to be extremely difficult to solve. At least a few thousandths of an inch clearance is required between the ring and the groove in order to permit the ring to move and to position itself radially under its own resiliency. As the combined effect of inertia and/or gas pressure urges a ring against one particular wall of the groove, it is obvious that the gas pressure or oil can find its way in the clearance area between the ring and the opposite side of the groove. The periodic nature of both the inertia and the gas pressure forces is such that conventional ring installations exhibit a tendency to move back and forth in a periodic relationship in the groove. This movement causes a corresponding series of periods in which the ring permits the passage of oil or gas pressure around it. It is generally recognized that oil will tend to move around underneath and in back of a ring, and gradually work its way into the upper area of the cylinder where it is carbonized by the combustion heat.

It is recognized, of course, that the oil ring should permit enough lubricant to remain on the cylinder wall to sufficiently lubricate the one or more compression rings. The essential function of an oil ring, then, is not to scrape all of the oil from the cylinder wall, but to meter lubricant to the compression rings by permitting a thin, uniform, consistent film of oil to be retained along the cylinder wall. Theoretically, it is easier to provide this consistency with a single rail oil ring design, rather than a double rail oil ring design, since it is much more difficult to manufacture a double rail wherein both rails provide consistent pressure against the cylinder wall.

It is seen then that there exists a need for an oil control ring that provides a consistent amount of oil to the cylinders to properly lubricate the compression rings, without allowing excess oil which could impair engine performance or contaminate engine exhaust.

SUMMARY OF THE INVENTION

This need is met by the oil control ring according to the present invention, wherein the oil control ring has a reverse keystone angle on the top of the ring. In accordance with one aspect of the present invention, a piston ring assembly comprises a piston ring positioned in a piston groove, and having a top front extending downwardly along a top side of the piston groove and toward a cylinder wall at an angle of approximately three degrees, with respect to a horizontal to form a "reverse keystone" top side angle, and further having a bottom surface extending inwardly along a bottom side of the piston groove. The piston ring assembly further comprises a rail extending outwardly from the ring to form a ring face adapted to engage the cylinder wall. The rail has a first front surface extending outwardly and downwardly from the top surface of the piston ring toward an upper surface of the ring face at an angle of approximately thirty degrees surface with respect to a vertical, a second front surface extending downwardly and inwardly from a lower surface of the ring face at an angle of approximately fifteen degrees with respect to the horizontal, and a third front surface extending vertically downwardly from the second front surface toward the bottom side of the piston groove. Finally, the piston ring assembly comprises a spring for providing an outward force on the rail, causing the rail to scrape oil off of the cylinder wall during downward movement of the piston. Reciprocal movement of the piston causes cocking of the piston ring about the scraping corner of the ring face.

This cocking movement of the piston ring about the scraping corner minimizes the oil consumption of the piston engine because the reverse keystone top side angle produces concentrated and high seal pressure around the top side of the ring and the ring face as the piston moves downward. On the upstroke, the ring face tends to slide over the oil film rather than scrape oil toward the combustion chamber. An advantage of the concentrated and high seal pressure is that it reduces the amount of oil allowed to pass both behind the piston ring and along the ring face, thereby reducing oil consumption.

Other advantages and features of the invention will be apparent from the following description, the accompanying drawings and the appended claims.

DETAILED DESCRIPTION OF THE PREFERRED EMBODIMENTS

Figure 1A:
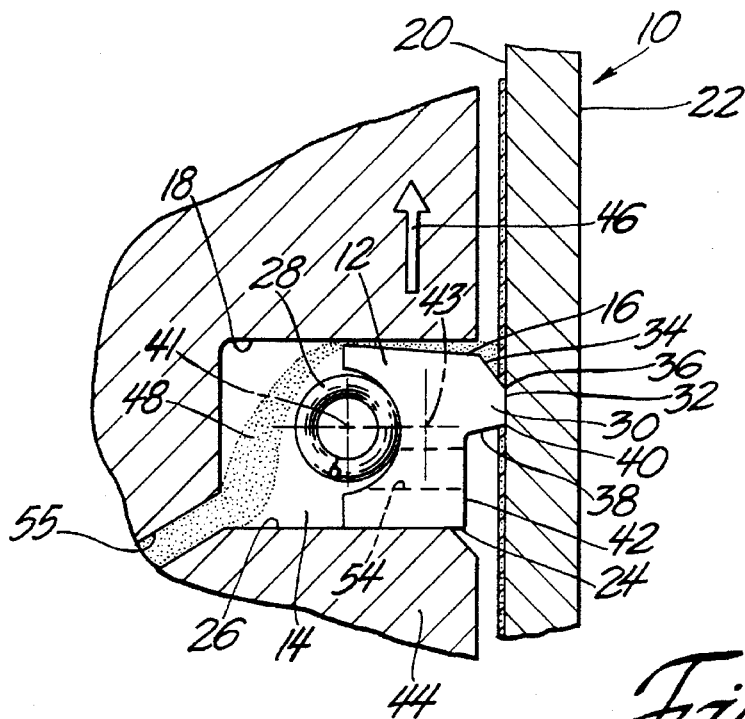
FIGS. 1A and 1B show a cross-sectional illustration of a piston ring assembly of the present invention, wherein the piston ring is a single rail oil control ring.
Figure 1B:
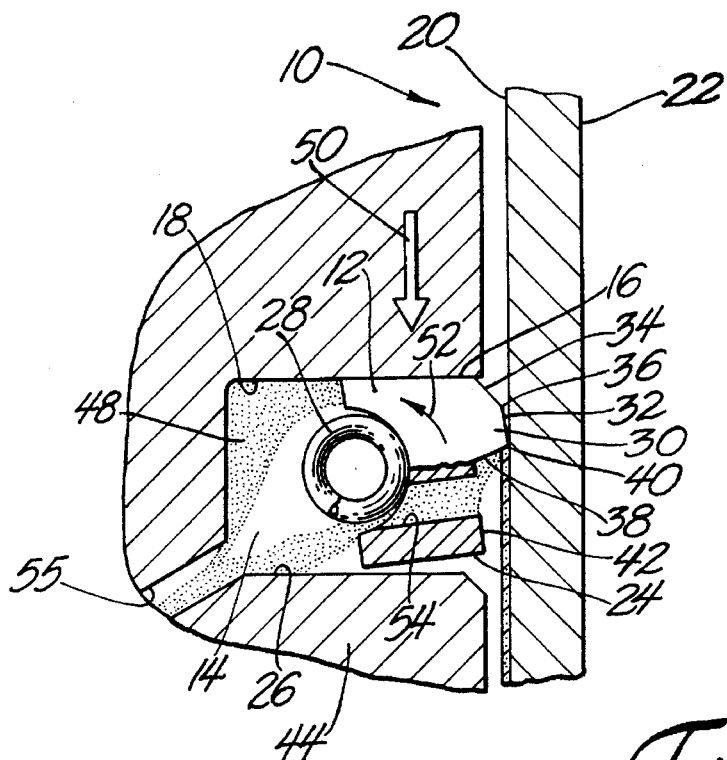

Referring now to the drawings, in FIGS. 1A and 1B there is illustrated a cutaway, cross-sectional view of a piston ring assembly 10. Although FIGS. 1A and 1B illustrate an assembly adapted for heavy duty applications, the piston ring assembly 10 can be applied to light duty applications as well. The piston ring assembly 10 includes a piston ring, such as an oil control ring 12, positioned in a piston groove 14. The ring 12 may be formed of iron, steel, or other suitable materials, and is spring loaded with a "reverse keystone" top side angle along a top surface 16. The top surface 16 extends downwardly along a top side 18 of the piston groove 14 and toward a cylinder wall 20 of cylinder 22 at a first angle of between one and ten degrees, and preferably approximately three degrees, with respect to the horizontal. A bottom surface 24 of the ring 12 extends inwardly along a bottom side 26 of the piston groove 14.

Continuing with FIGS. 1A and 1B, the piston ring assembly 10 further includes a spring 28, which provides an outward force to push the ring 12 toward the cylinder wall 20. A rail 30 protrudes outwardly from the ring 12 such that when the spring 28 pushes the ring 12, the rail 30 extends toward the cylinder wall 20. The rail 30 defines a ring face 32 adapted to engage the cylinder wall 20. The oil ring face may be formed by any suitable method, including profile grinding, which offers low unit pressure variation and consistent performance.

The rail 30 has a first front surface edge 34 which extends outwardly and downwardly from the top surface 16 of the ring 12 toward an upper corner 36 of the ring face 32 at a second angle of between ten and thirty degrees, and preferably less than thirty degrees, with respect to the vertical. A second front surface 38 extends downwardly and inwardly from a lower corner 40 of the ring face 32 at a third angle of between three and fifteen degrees, and preferably less than fifteen degrees, with respect to the horizontal. Finally, a third front surface 42 extends substantially vertically downwardly from the second front surface 38 toward the bottom side 26 of the groove 14.

Referring now to FIG. 1A, the ring 12 is retained in the groove 14 in a piston 44. During upward movement of the piston 44 in the cylinder 22, in the direction shown by arrow 46, oil 48 above the ring face 32 is forced between the first front surface 34 and the top surface 16 into the piston groove 14 to an inner portion of the piston groove 14. Conversely, during downward movement of the piston 44, as illustrated in FIG. 1B with the direction of piston movement shown by arrow 50, the downward force of the piston causes the ring 12 to cock about the lower ring face corner 40, in the direction of arrow 52. This causes the ring face 32 to tilt away from the cylinder wall 20, leaving the lower corner 40 of the ring face 32 in scraping abutment with the cylinder wall 20.

The change in face 32 attitude plus the increase in unit pressure at the lower corner 40 of the ring face 32 improves oil control by providing a consistent, but not excessive, amount of oil to reach the engine cylinders. In addition, the seal between the top surface 16 of the ring 12 and the top side 18 of the piston groove 14 prevents oil 48 in the back of the groove 14 from passing between the top surface 16 and the top side 18 and reaching the combustion chamber of the engine.

The lower corner 40 of the ring face 32 is situated on a horizontal line which passes through the center of the spring 28, as shown by cross-hairs 41. Since the spring 28 is located in the approximate middle of the ring 12, the lower corner 40 is also situated on a horizontal line which passes through the center of the ring 12, as shown by cross-hairs 43. Therefore during upward movement of the piston 44, the corner 40, and the cross-hairs 41 and 43, generally share a common horizontal line. Since the spring 28 is located at the approximate pivot point of the ring 12, the spring 28 does not affect the torsional movement of the ring 12. Hence, this design prevents the spring 28 pressure from inhibiting the rotational movement about the lower corner 40, so that the spring 28 provides only the radial force against the cylinder wall 20, which force the ring 12 inherently lacks without the spring 28.

In a preferred embodiment of the present invention, the lower corner 40 is on the horizontal center line 41 through the spring 28 whether the piston is in the sliding mode or the scraping mode. During downward movement of the piston 44, the downward force urges the ring 12 axially against the groove top side 18, causing cocking of the ring 12 about the lower corner 40, and the spring 28 provides an outward force on the ring 12 to bring the rail 30 into scraping abutment with the cylinder wall 20. This leaves the lower corner 40 in scraping abutment with the cylinder wall 20. On the downstroke of the piston 44, then, the reverse keystone angle along the top surface 16 of the ring 12 produces concentrated and high seal pressure at the top side 16 of the ring 12 so oil 48 is scraped away from the cylinder wall 20. The oil 48 that is scraped away from the cylinder wall 20 in FIG. 1B is guided to one or more oil ring drainage slots 54 which direct the oil to an interior of the piston 44, through a piston drainage slot 55, and, ultimately, toward an engine crankcase. On the upstroke of the piston 44, the piston does not exert a twisting moment on the ring 12. Hence, the ring face 32 tends to slide over the oil 48 which collects on the cylinder wall 20 rather than scrape oil toward a combustion chamber. Excess oil flows up over the top surface 16 as shown in FIG. 1A, to the piston groove drainage slot 55.

Although FIGS. 1A and 1B illustrate a piston ring assembly 10 wherein the piston ring 12 has a single rail, the concept may be applied to a piston ring having a double rail. In the double rail configuration, a second ring face would extend from the substantially vertical third front surface 42 below the oil drainage slots 54. The ring face of the second rail is, preferably, substantially identical to the ring face 32 illustrated in the single rail design of FIGS. 1A and 1B. In the double rail configuration, the top rail is moved away from the cylinder wall during the cocking movement of the ring around the spring. This causes a double pressure on the lower rail which remains in contact with the cylinder wall, providing an extremely strong scraping action during downward movement of the piston.

Having described the invention in detail and by way of reference to the preferred embodiment thereof, it will be apparent that other modifications and variations are possible without departing from the scope of the invention defined in the appended claims.

What is claimed is:

1. A piston assembly comprising:

a piston ring for positioning in a piston groove in a piston, said piston ring having a top surface for positioning closest to a top side of said piston groove, said top surface extending downwardly along said top side of said piston groove and toward a cylinder wall at a first angle of between one and ten degrees with respect to a horizontal definable when the ring is not cocked, and further having a bottom surface extending inwardly along a bottom side of said piston groove, said ring cocking about its cross sectional axis during each up and down stroke of said piston;

a spring positioned to radially force said piston ring against said cylinder wall and to provide a consistent amount of oil control;

a rail extending radially outwardly from said piston ring to form a ring face for contacting said cylinder wall; and means for causing cocking movement of said piston ring about a scraping corner of the ring face to urge said rail into scraping abutment with said cylinder wall during downward movement of said piston.

2. A piston assembly as claimed in claim 1 wherein said first angle is three degrees with respect to a horizontal.

3. A piston assembly as claimed in claim 1 wherein said piston ring is an oil control ring.

4. A piston assembly as claimed in claim 1 wherein said rail forms a ring face.

5. A piston assembly as claimed in claim 4 wherein said spring provides an outward force on said piston ring such that said ring face contacts said cylinder wall.

6. A piston assembly as claimed in claim 1 further comprising at least one oil drainage slot for allowing oil to drain to an interior of said piston.

7. A piston assembly as claimed in claim 4 wherein said rail includes a first surface extending outwardly and downwardly from said top surface of said piston ring toward an upper corner of said ring face at a second angle of between ten and thirty degrees with respect to a vertical.

8. A piston assembly as claimed in claim 4 wherein said rail includes a second surface extending downwardly and inwardly from a lower corner of said ring face at a third angle of between three and fifteen degrees with respect to a horizontal.

9. A piston assembly as claimed in claim 8 wherein said lower corner is situated on a horizontal center line through said spring.

10. A piston assembly as claimed in claim 4 wherein said rail includes a third surface extending vertically downwardly from a second surface toward said bottom side of said piston groove.

* * * * *